Patented Feb. 6, 1940

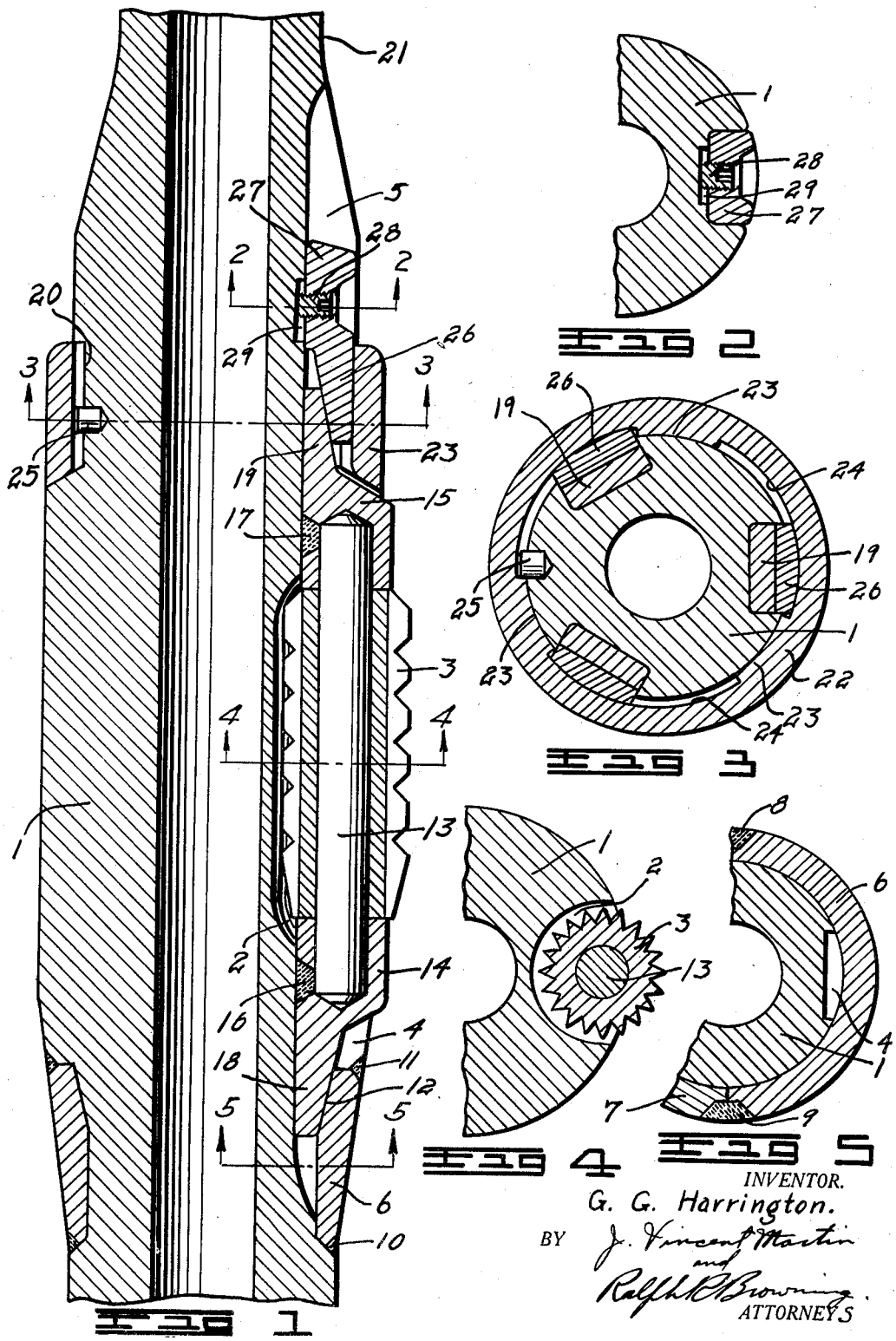

2,189,034

UNITED STATES PATENT OFFICE 2,189,034

REAMER

George G. Harrington, Houston, Tex., assignor to Reed Roller Bit Company, Houston, Tex., a corporation of Texas Application December 8, 1938, Serial No. 244,554
Renewed August 9, 1939

10 Claims. (Cl. 255—73)

This invention relates to a reamer for use in drilling wells, and has for its general object the provision of a means for firmly and securely yet detachably mounting a reamer cutter on a reamer body.

In mounting reamer cutters within the recesses it is desirable that they be mounted as firmly as possible and it is desirable that there be no possibility of play between any of the parts constituting the mounting during the operation of the reamer.

It is, therefore, an object of this invention to provide a structure for mounting a reamer cutter in a recess in the side of the reamer body in such a manner as to give the greatest possible degree of rigidity to the mounting, prevent any play or lost motion between the parts of the mounting during operation, and at the same time utilize the smallest possible number of parts and eliminate any parts which might be broken or distorted.

It is a further object of this invention to provide a reamer mounting, the structure of which is such that the reamer cutter may be removed and replaced with a minimum of effort, without necessity for any special skill, and without necessity for any special or extraordinary tools.

Another object of this invention is to provide a structure in which a reamer cutter may be rotatably mounted upon a support and provided with the proper clearance in the factory under the supervision of skilled workmen, and that thereafter the reamer cutter assembly including the cutter and its mounting may be readily secured on or removed from a reamer body in use in the field.

Other objects and advantages will become apparent from the following description taken in connection with the accompanying drawing, it being understood that the same is by way of illustration and example only.

In the drawing:

Fig. 1 is a longitudinal cross section through a reamer body constructed in accordance with this invention and through a reamer cutter mounted therein.

Fig. 2 is a partial transverse cross section taken along the line 2—2 of Fig. 1.

Fig. 3 is a transverse cross section taken along the line 3—3 of Fig. 1.

Fig. 4 is a partial transverse cross section taken along the line 4—4 of Fig. 1.

Fig. 5 is a partial transverse cross section taken along the line 5—5 of Fig. 1.

In accordance with this invention, the reamer body 1 is provided with a plurality of major recesses 2 adapted to receive reamer cutters 3 of the roller type. At the lower ends of each of these major recesses 2 is an auxiliary recess 4 and at the upper end of the second auxiliary recess 5, these auxiliary recesses opening into the major recess at the opposite ends thereof.

Secured about the reamer body 1 and partly overlying the lower auxiliary recess 4 is a split ring formed in two halves 6 and 7 and welded to the body member. This ring is preferably mounted in a circumferential groove or channel so that it is in effect counter-sunk and its outer surface forms a continuation of the smooth outer contour of the body 1. The two halves 6 and 7 of this ring are welded to each other at their ends as shown at 8 and 9 in Fig. 5 and are welded to the body throughout their entire lengths along both edges as illustrated at 10 and 11, respectively. The inner face of this ring along that portion nearest to the major recess is beveled at 12 so as to form with the bottom of the auxiliary recess 4 a tapered socket for a purpose presently to be described.

The cutter 3 is rotatably mounted on a cutter pin or shaft 13, and the opposite ends of this shaft are inserted in openings formed in blocks 14 and 15, respectively. These blocks are secured to the ends of the shaft 13 by means of welding 16 and 17, the blocks 14 and 15 being spaced apart before welding to the shaft 13 by such a distance as will give the proper clearance for the cutter 3. The cutter 3 is thus permanently mounted upon the shaft 13 so that it may rotate freely yet not be permitted an excessive endwise movement upon the shaft. It is noted that the block 14 has a wedge-shaped tongue-like part 18 projecting away from the cutter and that the block 15 has a similarly shaped tongue-like part 19 likewise projecting away from the cutter. These blocks 14 and 15 are so arranged that when the cutter 3 is in proper position within the major recess 2 these blocks will lie in the bottoms of the auxiliary recesses 4 and 5, respectively. The wedge-shaped tongue-like part 18 is adapted to be wedged underneath the ring 6 and to engage the beveled surface 12 within this ring so as to be wedged between the ring and the bottom of the auxiliary recess 4.

The end of the body 1 adjacent the auxilary recesses 5 is provided with a circumferential channel 20 which is shallower than the auxiliary recesses 5 and adapted to intersect said recesses. The recesses 5 it will be noted are open longitudinally of the body toward a part 21 of the body which is of smaller diameter than the part in which the channel 20 is formed. They thus form three longitudinally extending channels leading to and past the circumferential channel 20.

A ring 22 is also provided, this ring having a minimum internal diameter at the points 23 corresponding in diameter to the body within the channel 20, and a maximum internal diameter at the portions 24 corresponding to the outer diameter of the body on the opposite side of the channel 20 from the major recesses. It is to be noted that the parts 23 of minimum diameter are of substantially the same circumferential extent as the auxiliary recesses 5 so that the ring 22 may be slipped longitudinally over the body from above as seen in Fig. 1 with the parts 23 passing along the auxiliary recesses 5 until the ring overlies the channel 20. The ring may then be rotated toward the right as seen in Fig. 3 until the parts 23 are disposed within the channel 20 and no longer overlie the recesses 5. This ring may be prevented from excessive rotation along the channel 20 by means of a dowel pin 25 set in the body 1 and projecting from the bottom of the channel 20 at such a point that when the ring 22 has been rotated a sufficient distance to permit the parts 23 to clear the recesses 5, one of the parts 23 will strike the dowel pin 25.

An inspection of Fig. 1 will now reveal that when the ring 23 has been positioned there will be left between the interior of this ring and the tongue-like part 19 a wedge-shaped opening having a wider part upward in Fig. 1. In order to tightly secure the block 15 in position and urge the cutter assembly downward so as to more tightly wedge the part 18 beneath the ring 6 a wedge 26 is driven into the space between the ring 23 and the part 19. This wedge has a tail portion 27 which substantially fits the auxiliary recess 5 and rests against the bottom thereof, and a set screw 28 is threaded through this tail portion and adapted to contact the body 1 beneath the wedge member 26. The body 1, however, is cut away in the bottom of the recess 5 to form a channel 29 of tapering depth, this channel tapering from a shallow depth at its upper end to a relatively greater depth at its lower end. This channel is adapted to receive the set screw 28 and to assist in preventing the wedge 26 from backing out from its wedging engagement.

In the course of manufacture, the body 1 will be formed substantially as above described and the split ring 6, 7 will be welded in place as shown. The ring 23 and the wedges 26 will also be formed as described.

The cutter 3 will then be rotatably mounted upon the cutter pin 13 and the blocks 14 and 15 secured to the ends of this cutter pin to leave the proper clearance for the cutter by welding the blocks 14 and 15 thereto as indicated at 16 and 17. The cutter assembly is then placed in proper position with respect to the body by inserting the tongue 18 beneath the ring 6 and urging it into place, at the same time placing the block 15 in the corresponding auxiliary recess 5. The ring 23 is then put in position by sliding it up over the body with the parts 23 passing through the auxiliary recesses 5 until the ring overlies the channel 20. The ring is then rotated, the parts 23 sliding through the channel 20 to the position shown in Fig. 3 wherein one of the parts 23 will abut the dowel pin 25 and prevent further rotation of the ring. The wedge 26 will then be inserted between the ring 22 and the tongue 19 and driven home, after which the set screw 28 will be tightened to prevent the wedge 26 from backing out. The device is now in condition for use.

In removing the cutters from such a device it is only necessary to loosen the set screw 28, drive the wedge 26 out of its wedging engagement, rotate the ring 22 to bring the parts 23 over the auxiliary recesses 5, slide the ring back over the body member away from the cutter and lift the cutter assembly out.

It will be seen from the foregoing that a device has been provided whereby a cutter may be firmly and securely mounted within a reamer body without the necessity for any skilful adjustment or operation and without necessity for any special tools. It will further be seen that by this invention there has been provided a device permitting the use of interchangeable cutter assemblies so that cutter assemblies consisting of the cutters, the cutter pins and the cutter supporting blocks may be assembled in the factory under skilled supervision to provide a proper cutter bearing, and these cutter assemblies secured within the reamer bodies or removed therefrom at will while the device is in the field.

Having described my invention, I claim:

1. In a reamer, a reamer body having a major recess in the outer surface thereof and an auxiliary recess opening into each end of said major recess, said auxiliary recesses being of rectangular cross section, a part overlying a portion of one of said recesses to form a tapered socket opening toward said major recess, a roller cutter adapted to be mounted in said major recess, a shaft on which said cutter is rotatably mounted, and a block secured to each of the opposite ends of said shaft, one of said blocks having a tapered extension adapted to fit within said socket and the other of said blocks having a tapered extension to fit within the other of said auxiliary recesses, a ring removably mounted on said body and overlying said last mentioned auxiliary recess, and means wedged between said ring and said last mentioned tapered extension to lock said cutter assembly in place with said blocks in said auxiliary recesses and said cutter in said major recess.

2. In a reamer, a reamer body having a major recess in the outer surface thereof and an auxiliary recess opening into each end of said major recess, one of said recesses being in the form of a tapered socket opening toward said major recess, a roller cutter adapted to be mounted in said major recess, a shaft on which said cutter is rotatably mounted, a block on one end of said shaft having a tapered part adapted to fit within said socket, a block on the other end of said shaft having a tapered part to fit within the other of said auxiliary recesses, means removably mounted on the body and overlying said last mentioned auxiliary recess and means wedged between said last mentioned means and said last mentioned tapered part to lock said cutter assembly in place on said body.

3. In a reamer, a reamer body having a major recess in the outer surface thereof and an auxiliary recess opening into each end of said major recess, one of said recesses being in the form of a tapered socket opening toward said major recess, a roller cutter adapted to be mounted in said major recess, a shaft on which said cutter is rotatably mounted, a block on one end of said shaft having a tapered part adapted to fit within said socket, a block on the other end of said shaft having a tapered part to fit within the other of said auxiliary recesses, means removably mounted on the body and overlying said last mentioned auxiliary recess, and a wedge driven between said last mentioned means and said last mentioned tapered part to lock said cutter assembly in place on said body.

4. In a reamer, a reamer body having a major recess in the outer surface thereof and an auxiliary recess opening into each end of said major recess, one of said recesses being in the form of a tapered socket opening toward said major recess, a roller cutter adapted to be mounted in said major recess, a block on one end of said shaft having a tapered part adapted to fit within said socket, a block on the other end of said shaft having a tapered part to fit within the other of said auxiliary recesses, means removably mounted on the body and overlying said last mentioned auxiliary recess, and a wedge driven between said last mentioned means and said last mentioned tapered part to lock said cutter assembly in place on said body, and a set screw in said wedge adapted to engage a part of said body to prevent said wedge from backing out of wedging engagement.

5. In a reamer, a reamer body having a major recess in the outer surface thereof and an auxiliary recess opening into one end of said major recess, means overlying a part of said auxiliary recess, a block in said recess having a part disposed beneath said means and a bearing part, a cutter in said major recess rotatably mounted on said bearing part, and means adapted to wedgingly engage between said first means and said block to secure said block in said auxiliary recess.

6. In a reamer, a reamer body having a major recess in the outer surface thereof and an auxiliary opening into one end of said major recess, a ring overlying a part of said auxiliary recess, a block in said recess having a part disposed beneath said ring and a bearing part, a cutter in said major recess rotatably mounted on said bearing part, and means adapted to wedgingly engage between said ring and said block to secure said block in said auxiliary recess.

7. In a reamer, a reamer body having a major recess in the outer surface thereof and an auxiliary recess opening into one end of said major recess, a ring longitudinally movable on said body and overlying said auxiliary recess, a block in said recess having a part disposed beneath said ring and a bearing part, a cutter in said major recess rotatably mounted on said bearing part, and means adapted to wedgingly engage between said ring and said block to secure said block in said auxiliary recess.

8. In a reamer, a reamer body having a plurality of major recesses in the outer surface thereof, an auxiliary recess opening into one end of each of said major recesses, a ring having parts projecting inwardly and adapted to move along said auxiliary recesses when said ring is moved longitudinally of said body, said body having a circumferential channel intersecting said auxiliary recesses and adapted to receive said parts to permit rotation of said ring when said parts register with said channel, said parts and said channel being so positioned that they will register when said ring overlies a part of said auxiliary recesses, whereby said ring may be rotated to move said parts into said channel to prevent longitudinal movement of said ring on said body.

9. In a reamer, a reamer body having a plurality of major recesses in the outer surface thereof, an auxiliary recess opening into one end of each of said major recesses, a ring having parts projecting inwardly and adapted to move along said auxiliary recesses when said ring is moved longitudinally of said body, said body having a circumferential channel intersecting said auxiliary recesses and adapted to receive said parts to permit rotation of said ring when said parts register with said channel, said parts and said channel being so positioned that they will register when said ring overlies a part of said auxiliary recesses, whereby said ring may be rotated to move said parts into said channel to prevent longitudinal movement of said ring on said body, and means for limiting such rotating movement of said ring upon said body.

10. In a reamer, a reamer body having a plurality of major recesses in the outer surface thereof, an auxiliary recess opening into one end of each of said major recesses, a ring having parts projecting inwardly and adapted to move along said auxiliary recesses when said ring is moved longitudinally of said body, said body having a circumferential channel intersecting said auxiliary recesses and adapted to receive said parts to permit rotation of said ring when said parts register with said channel, said parts and said channel being so positioned that they will register when said ring overlies a part of said auxiliary recesses, whereby said ring may be rotated to move said parts into said channel to prevent longitudinal movement of said ring on said body, a part of a reamer cutter mounting disposed in each of said auxiliary recesses beneath said ring, and means fitting within said auxiliary recesses to hold said mounting part in said recesses and prevent said ring parts from rotating into register with said recesses.

GEORGE G. HARRINGTON.